(12) United States Patent
Marsden et al.

(10) Patent No.: US 8,757,735 B2
(45) Date of Patent: Jun. 24, 2014

(54) VELOCITY SENSITIVE PASSENGER VEHICLE TRAILER BRAKE CONTROLLER

(71) Applicant: Ford Global Technologies, Dearborn, MI (US)

(72) Inventors: Doug William Marsden, Dearborn, MI (US); Erick Michael Lavoie, Dearborn, MI (US); Greg Esper, Whitmore Lake, MI (US); Kirk Matthew Englert, Dearborn, MI (US)

(73) Assignee: Ford Global Technologies, Dearborn, MI (US)

( * ) Notice: Subject to any disclaimer, the term of this patent is extended or adjusted under 35 U.S.C. 154(b) by 0 days.

(21) Appl. No.: 13/945,752

(22) Filed: Jul. 18, 2013

(65) Prior Publication Data

US 2013/0311059 A1   Nov. 21, 2013

Related U.S. Application Data

(63) Continuation of application No. 11/160,644, filed on Jul. 1, 2005, now Pat. No. 8,511,759.

(51) Int. Cl.
*B60T 7/20* (2006.01)
(52) U.S. Cl.
USPC ...................................... 303/123; 188/112 R
(58) Field of Classification Search
USPC ............ 303/7, 123, 124, 20; 188/3 H, 112 R, 188/112 A
See application file for complete search history.

(56) References Cited

U.S. PATENT DOCUMENTS

| | | | |
|---|---|---|---|
| 5,292,188 A | 3/1994 | Okazaki |
| 5,539,641 A | 7/1996 | Littlejohn |
| 5,615,930 A | 4/1997 | McGrath et al. |
| 5,620,236 A | 4/1997 | McGrath |
| 5,782,542 A | 7/1998 | McGrath |
| 5,785,393 A | 7/1998 | McGrath |
| 5,792,968 A | 8/1998 | Takemasa et al. |
| 5,800,025 A | 9/1998 | McGrath |
| 6,039,410 A | 3/2000 | Robertson |
| 6,139,118 A | 10/2000 | Hurst |
| 6,202,018 B1 | 3/2001 | Stumpe |
| 6,273,522 B1 | 8/2001 | Feetenby |
| 6,636,047 B2 | 10/2003 | Arlt et al. |
| 6,666,527 B2 | 12/2003 | Gill et al. |
| 6,668,225 B2 | 12/2003 | Oh et al. |
| 6,705,684 B1 | 3/2004 | Garvey |
| 2004/0026987 A1 | 2/2004 | Davis |
| 2005/0151417 A1 | 7/2005 | Rudd, III |
| 2006/0076827 A1 | 4/2006 | Albright et al. |
| 2006/0214506 A1 | 9/2006 | Albright et al. |

*Primary Examiner* — Xuan Lan Nguyen
(74) *Attorney, Agent, or Firm* — Angela M. Brunetti; Raymond Coppiellie

(57) ABSTRACT

A method of controlling a trailer brake system using a trailer brake controller positioned within a passenger vehicle is provided. The method includes obtaining intended braking inputs and developing an effective baseline trailer brake controller output profile based thereon. The method scales the effective baseline trailer brake controller output profile in response to an adjustable gain setting set by an operator. A vehicle velocity is obtained and used to calculate a correction factor to the effective baseline trailer brake controller output profile. The effective baseline trailer brake controller output profile is then adjusted using the correction factor to generate a corrected trailer brake controller output signal.

17 Claims, 4 Drawing Sheets

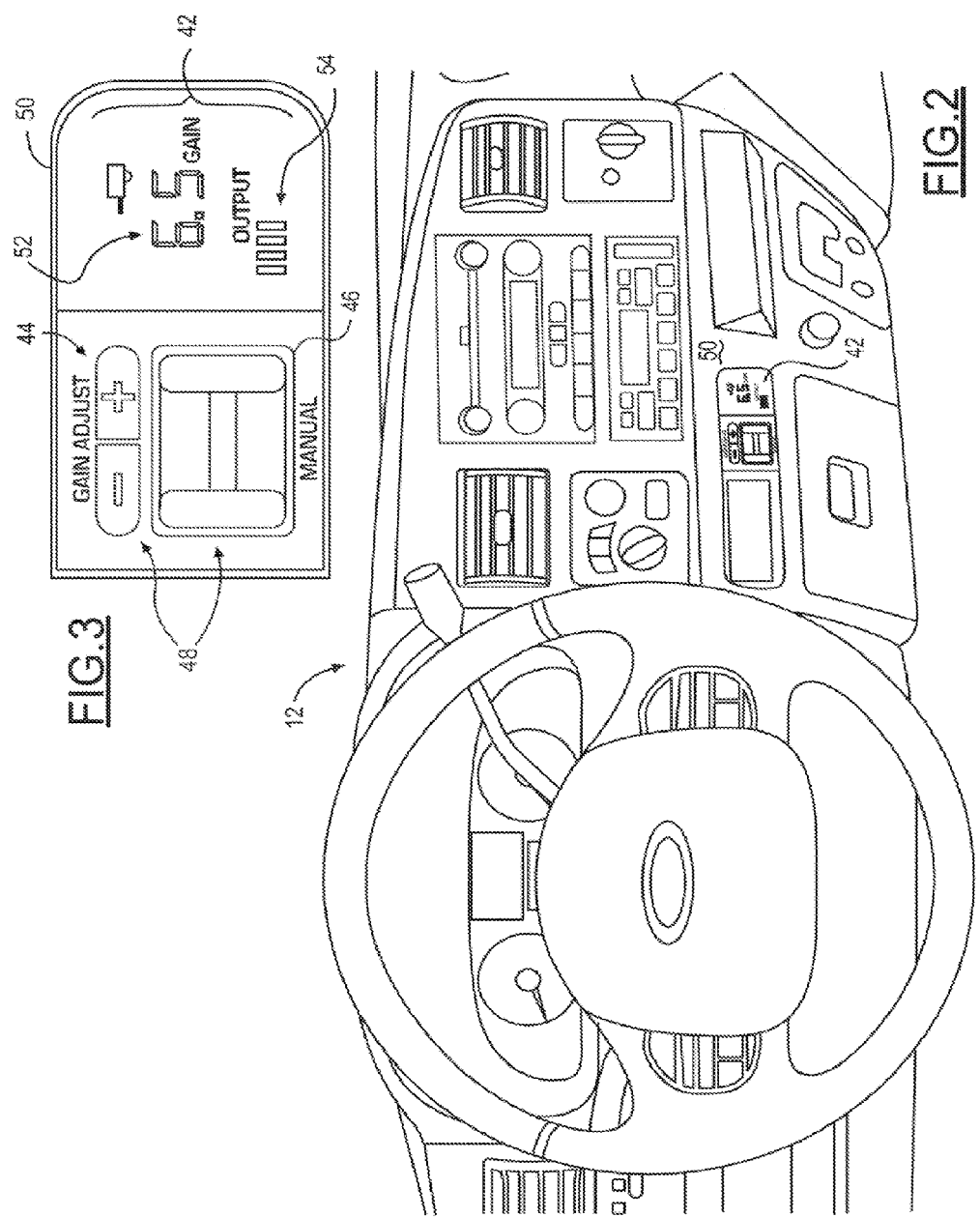

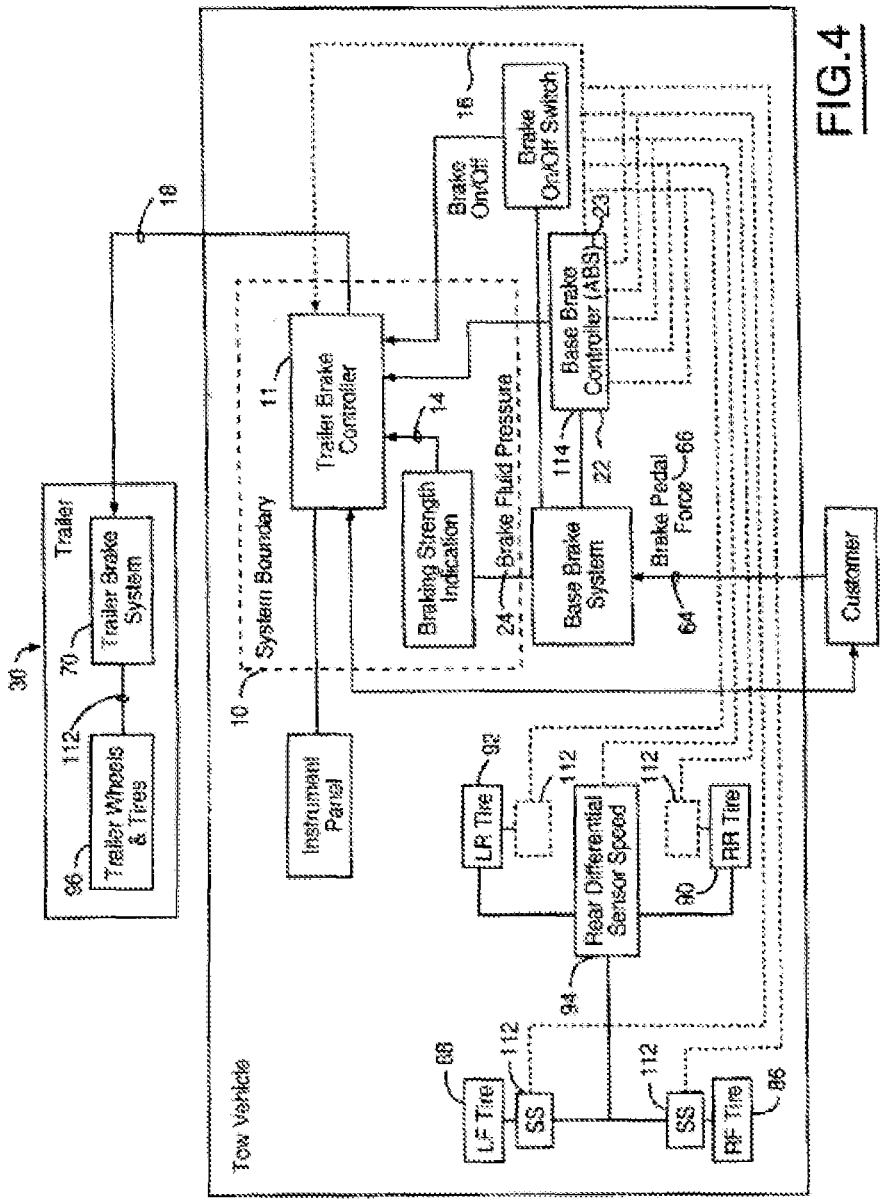

VELOCITY SENSITIVE PASSENGER VEHICLE TRAILER BRAKE CONTROLLER

CROSS REFERENCE

This application is a Continuation of co-pending U.S. application Ser. No. 11/160,644, filed Jul. 1, 2005 herein incorporated by reference.

TECHNICAL FIELD

The present invention relates generally to a passenger vehicle brake controller and more particularly to a passenger vehicle trailer brake controller.

BACKGROUND OF THE INVENTION

Passenger vehicle transport capacity is an important design aspect of modern vehicles. The ability to haul objects and equipment is often as important as the vehicle's ability to transport additional passengers. Solutions aimed at increasing a vehicle's hauling capabilities must not only be directed at improving the vehicle's utility but must also be directed towards improving a vehicle's safety and performance while accomplishing this task. One traditional approach towards improving a vehicle's transport capabilities has been through the addition of a trailer attached to the vehicle. Trailers allow for a wide range of items to be transported by a vehicle, often without impacting transport capabilities of the vehicle's passenger compartment.

Passenger vehicles commonly control trailer braking through the use of a trailer brake controller located within the vehicle. The trailer is commonly equipped with electrically actuated trailer brakes. An operator sets the gain on the controller, where the gain dictates how much electrical output is generated by the controller for a given set of vehicle inputs. The controller utilizes a brake input signal in combination with the user set gain to generate a brake control signal. It is known that this signal can take different forms, such as a duty cycle output or DC voltage output. This control signal is sent to the electrically actuated brakes which are thereby utilized to effectuate braking within the trailer. Systems such as described translate vehicle input, such as brake pedal force or position, brake pressure or vehicle acceleration, into a brake control signal which is adjustable according to the operator set gain. The brake control output signal, in turn, energizes the trailer brakes, which subsequently generates a braking torque on the trailer wheels.

Although the aforementioned systems may benefit from a lack of complexity, they fail to address the real world principles of mechanics that electrically actuated dual-servo drum brake assemblies are subject to. At increased velocities, it is known that the effectiveness of dual-servo brake torque is reduced and therefore a given brake control signal generates less effective brake torque at higher vehicle speeds than it did at lower vehicle speeds. As such, trailer brake performance degenerates at higher vehicle speeds. It would be highly desirable to have a trailer brake control apparatus and method that compensated for the loss of effective brake torque at increased vehicle speeds such that a consistent brake torque could be generated over the entire range of expected vehicle speeds.

It is further known, that a brake torque desirable over a broad range of vehicle speeds may be undesirable at low vehicle speeds. At low vehicle speeds, electric dual-servo drum braking systems are subject to significant increases in effectiveness wherein an applied brake torque may result in the brakes locking up (also known as "grabbiness") rather than incrementally applying braking friction. Existing electric trailer braking systems commonly fail to address this known phenomenon and thereby produce undesirable vehicle low-speed results. It would, therefore, be highly desirable to have a trailer braking system that improved low-speed performance by reducing brake-grab.

Finally, if one is to consider vehicle speed in the development of a brake control signal, it is important to consider the issues involved with accurate velocity calculation. Measurement of vehicle velocity based on wheel speed is subject to a host of errant readings due to automotive performance conditions. During rapid deceleration, it is known that a wheel may generate excessive slip relative to the road surface. In such circumstances, if vehicle speed was estimated based solely on this wheel in deep slip, the estimate would be lower than the actual vehicle speed. Similarly in rapid acceleration if a wheel breaks away from the road surface it may result in a velocity value abnormally high. In other circumstances, such as vehicle turns, outer wheels may experience a velocity increase while inner wheels a decrease. Thus it would be further beneficial to develop an improved method of calculating vehicle speed prior to its utilization in effecting the trailer brake control signal.

SUMMARY OF THE INVENTION

It is, therefore, an object of the present invention to provide a passenger vehicle braking system with an integrated trailer brake controller. It is a further object of the present invention to provide a passenger vehicle braking system with velocity sensitive performance.

In accordance with the objects of the present invention, a method of controlling a trailer brake system using a trailer brake controller positioned within a passenger vehicle is provided. The method includes obtaining intended braking inputs and developing an effective baseline trailer brake controller output profile based thereon. The method scales the effective baseline trailer brake controller output profile in response to an adjustable gain setting set by an operator. A vehicle velocity is obtained and used to calculate a correction factor to the effective baseline trailer brake controller output profile. The effective baseline trailer brake controller output profile is then adjusted using the correction factor to generate a corrected trailer brake controller output signal.

Other objects and features of the present invention will become apparent when viewed in light of the detailed description of the preferred embodiment when taken in conjunction with the attached drawings and appended claims.

BRIEF DESCRIPTION OF THE DRAWINGS

FIG. 2 is an illustration of an automotive dash assembly illustrating an embodiment of communication elements intended for use with the present invention;

FIG. 3 is a detail of the communication elements illustrated in FIG. 2, the communication elements are intended for use with a trailer brake controller in accordance with the present invention;

FIG. 4 is a block diagram of an embodiment of the trailer brake controller in accordance with the present invention;

DESCRIPTION OF THE PREFERRED EMBODIMENT(S)

Figure 1:
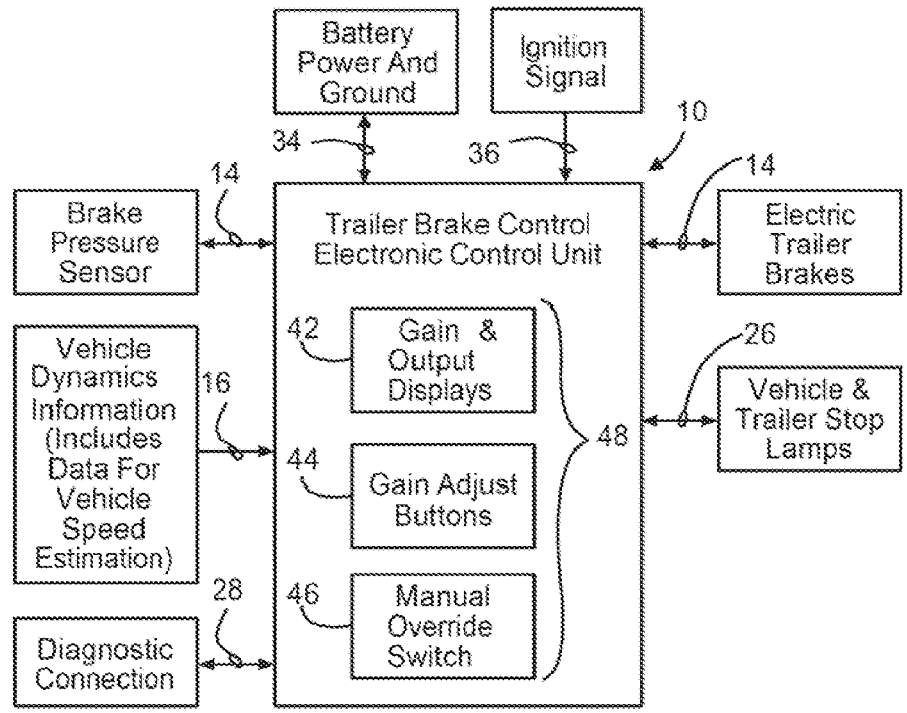
FIG. 1 is a block diagram of an embodiment of a trailer brake controller in accordance with the present invention.

Referring now to FIGS. 1 to 4, which are illustrations of a trailer brake controller 10 in accordance with the present invention. The trailer brake controller 10 is intended for integration into a passenger vehicle braking system. It is further intended that the trailer brake controller 10 be designed, assembled, and sold with the passenger vehicle such that its control characteristics can be properly set by the vehicle manufacturer for a specific passenger vehicle. Additionally, by integrating the trailer brake controller 10 into the passenger vehicle through manufacture, assembly and distribution, control and display features for the trailer brake controller 10 may be professionally integrated into the passenger vehicle 12 design. Thus, appearance, performance, safety, and customer convenience may be improved.

The trailer brake controller 10 utilizes control element 11 having an intended braking input 14 (such as a brake pressure input) and a vehicle speed input 16 in order to adjust the trailer brake output 18. It is contemplated that the intended braking 14 and vehicle velocity 16 inputs may be utilized to adjust trailer brake output 18 in a variety of fashions. One advantage of the present invention is that the relationship of the trailer brake output 18 to the brake pressure input 14 may be adjusted for the particular vehicle 12 in which the trailer brake controller 10 is mounted.

It is contemplated that the intended braking input 14 and the vehicle speed input 16 may be supplied by a variety of sources within the vehicle 12. In one embodiment, however, it is contemplated that the intended braking input 14 and the vehicle speed input 16 are supplied through a communication between the vehicle brake control system 22 (such as the antilock braking system or electronic stability control system) and control element 11. It is known that modern tow vehicle brake control systems 22 (such as ABS) contain sensors that can be used to estimate vehicle speed. By placing the vehicle brake control system 22 in communication with the control element 11, the vehicle speed input 16 may be easily estimated. Finally, the vehicle brake control system 22 may be utilized to communicate to the control element 11 when the system 22 has been activated. This can allow the trailer brake controller 10) to tailor its output 18 such that the trailer brakes works more efficiently with the vehicle brake control system 22. It should be understood that although the vehicle brake control system 22 may be utilized to supply both the intended braking input 14 and the vehicle speed input 16, in alternate embodiments, the intended braking input 14 may be supplied through a variety of known devices or sensors such as vehicle brake pressure 24, brake pedal force 66, brake pedal travel, or vehicle accelerometer. Again, although specific embodiments have been described that provide a brake pressure input 14 and a vehicle speed input 16, a variety of methods of obtaining these inputs would be obvious to one skilled in the art in light of this application.

It is intended that the trailer brake output 18 be capable of controlling a plurality of embodiments of trailer brakes. Although a variety of trailer brake outputs 18 are contemplated by the present invention, one embodiment contemplates the trailer brake output 18 taking the form of an electrical output. In addition, the trailer brake controller 10 may include a variety of additional components to increase its functionality and performance. A brake indicator lamp output 26 may be used in conjunction with the trailer brake output 18 to improve the safety and performance of the trailer brake controller 10. Similarly, a diagnostic input/output 28 may be included such that the trailer brake controller 10 may provide self diagnostic information concerning the trailer 30 and controller 10 to a service technician. This trailer brake electrical output 18 not only provides power to the trailer brakes, but by monitoring the electrical characteristics of this signal, the trailer brake controller 10 can inform a vehicle operator of improper electrical connection with the trailer or of damage to the trailer brake's electrical system 70. Power supplies 34, ignition run/start inputs 36, and other known elements may be utilized in conjunction with the present design to provide basic functionality, concepts well known in the art.

It is further contemplated that the trailer brake controller 10 may provide communication between the control element 11 and the owner/operator. Although this communication can take on a variety of forms, in one embodiment it is contemplated to take the form of a display 42, a user control input 44 (such as a gain input control) and an override switch 46. These communication elements 48 can be adapted and complimented to provide a range of communication and control to the owner/operator. Similarly, although these communication elements 48 may be positioned in numerous locations, one embodiment mounts them to the vehicle dash 50 (see FIGS. 2 and 3). By equipping the vehicle with such a control system during design and manufacture, the appearance of the communication elements 48 can be significantly improved and thereby increase customer satisfaction. The display 42 can include a gain display 52 and a signal strength display 54. The signal strength display 54 allows the owner operator to visualize the trailer brake output 18 signal and adjust the gain input control 44 to suit individual preferences. The override switch 46 can be operated by the owner/operator to apply the trailer brakes independently of the vehicle without braking. It is further contemplated that the display 42 may be utilized to communicate to the owner any improper connections or diagnostic faults determined by the control element 11. This can serve to increase the safety and awareness of the owner by properly apprising them of the status of their trailer's operation.

A novel feature of the present invention is derived from the methodology it invokes to develop a velocity tailored trailer brake output signal 18. A key innovation which enables velocity-sensitive trailer brake control is development of a generic trailer brake torque vs. speed vs. voltage mapping 19 preferably developed using laboratory testing of trailer brakes on a chassis dynamometer. By sweeping trailer wheel rotational speed and electric brake input voltage, while measuring brake torque output, the data shown in FIG. 6 can be collected for a single trailer brake or across the range of available electric trailer braking systems, considering critical noise factors, such as piece-to-piece brake system variability, brake lining wear, brake magnet wear and brake temperature. While the magnitude of the individual torque curves vary across trailer brake types, the characteristic decrease in torque as speed increases at higher voltages is adequately similar to create a generic relationship which can be used in open loop trailer brake control, as described earlier in this patent. The fact that the operator is required to set TBC gain for given trailer conditions provides adequate adjustment of the torque/speed/voltage mapping for a given trailer brake system.

Figure 6:
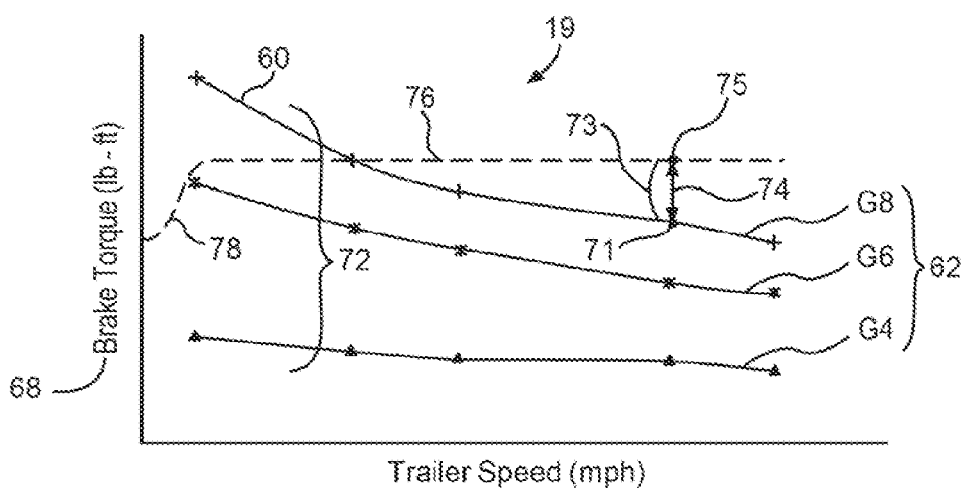
FIG. 6 is a graph of gain adjusted effective baseline trailer brake controller output profiles for use with the present invention.

The mapping curves 19 illustrated in FIG. 6 are contemplated to be multivariate curves dependent on intended braking inputs 14 and vehicle speed input 16 and therefore are in actuality three-dimensional plots. The curves 19, however, are represented as two-dimensional plots for simplification and clarity of discussion. The curves are representative of an effective baseline trailer brake controller output profile 60 utilized by the present invention. The customer set gain 62 can then be utilized to scale this effective baseline trailer brake controller output profile 60. It should be understood that a variety of scaling techniques and generic mapping techniques may be utilized in order to improve performance. Furthermore, although a single modified and scaled effective baseline trailer brake controller output profile 60 has been described, it should be understood that a plurality of differing or individually tailored profiles 64) may be utilized. The intended braking input 14 is intended to include any existing measurement of vehicle braking such as brake pedal force 66, brake fluid pressure 24, or similar methodology (see FIG. 4). It should be further understood that the determination of the effective baseline trailer brake controller output profile 60 need not constitute a specific calculation step but may remain defined simply by the intended braking inputs 14 and vehicle speed input 16.

The effective baseline trailer brake controller output profile 60 is indicative of the brake torque applied by the trailer brakes if the trailer brake output was produced under existing operational conditions and a constant supply voltage. As supply voltage is changed this profile changes, but the same downward trend shape exists over a range of supply voltages. A flaw of electric dual-servo drum brakes 70, as shown in FIG. 6, is that as vehicle speed 16 increases, a given trailer brake controller output 18 will produce reduced brake torque. Each of the effective baseline trailer brake controller output profiles 60 corresponds to a trailer brake controller output voltage scaled according to a plurality of available operator gain settings 62 (gain settings are effectively what determine the supply voltage). As can be seen, however, from the effective baseline trailer brake controller output profiles 60, as vehicle speed 16 increases, the effective brake torque begins to drop. This generates different braking performance as well as different braking feel as speeds increase.

Figure 7:
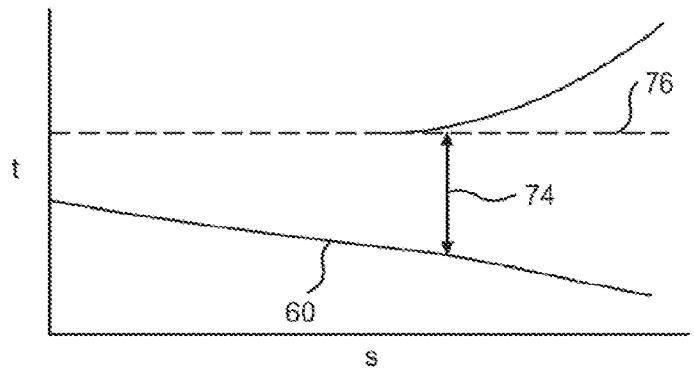
FIG. 7 is a detail of an effective brake torque curve as illustrated in FIG. 6, the detail showing an embodiment wherein brake torque is increased with increased vehicle velocity.

The present invention, however, includes logic within the trailer brake controller 10 adapted to adjust the trailer brake output 18 such that this drop off in effective brake torque is neutralized. The present invention obtains the vehicle velocity 16 (or trailer velocity) and uses this in conjunction with the effective baseline trailer brake controller output profile 60 to determine an unadjusted output 71 and an estimate of effective brake torque loss 73. The unadjusted output 71 is simply a value representative of a particular location along the effective baseline trailer brake controller output profile 60. The logic is then adapted to calculate a correction factor 74 that compensates for the effective brake torque loss 73 such that a constant brake torque 76 is achieved throughout the velocity range of the trailer. Although these calculations or steps are presently described in terms indicative of individual steps by the logic, it is equally contemplated that linear regression may be performed on the mapping values 19 such that the correction factor 74 may be directly computed from the intended braking input 14 and velocity input 16. The unadjusted output 71 is adjusted by the correction factor 74 to generate a corrected trailer brake output signal 75 that compensates for lost torque. The correction factor 74 can automatically make any range of partial corrections within the range of available supply voltage to provide a constant brake torque 76. In an alternate embodiment, the correction factor 74 may be utilized to increase the effective brake torque 72 as velocity increases (see FIG. 7). This allows a gradual ramp up in torque as speed increases.

The preceding discussion involved compensating for effective brake torque losses at increased vehicle velocities. It is known, however, that trailer brake performance suffers at low vehicle velocities as well. The low velocity performance issues arise from the physics of electrically actuated dual-servo drum brakes. At very low vehicle speeds, namely less than ten miles per hour, application of the unadjusted output 71 can result in brake grabbing or temporary seizing. This provides undesirable feel to the operator. The present invention, therefore, further includes logic adapted to utilize the correction factor 74 to reduce brake grabbing. This is accomplished by decreasing the trailer brake output 18 at low vehicle speeds 16 to the point where brake grabbing is alleviated. Although a simple reduction in controller output may be implemented, the present invention contemplates the development and use of a brake torque reduction curve 78 specifically adapted to minimize brake grab while maintaining optimal braking performance.

Figure 5:
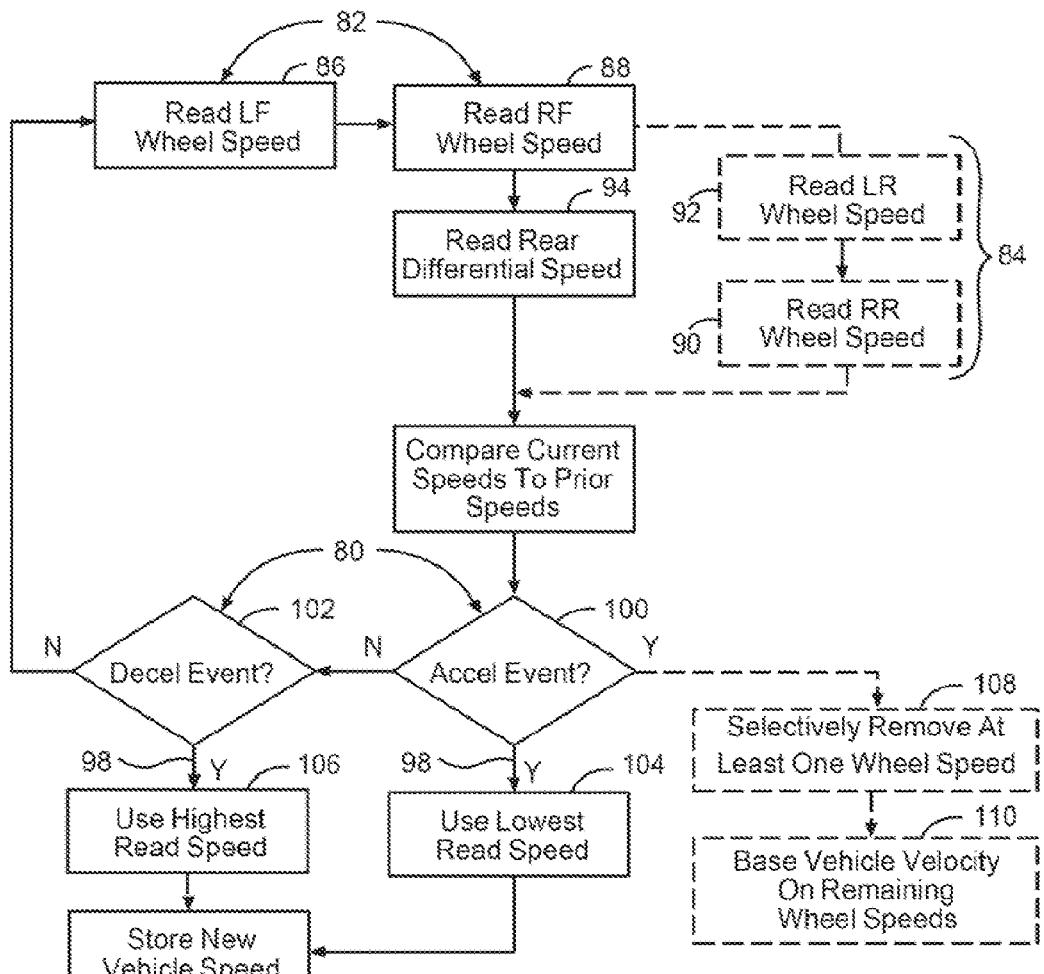
FIG. 5 is a flow diagram of an acceleration sensitive vehicle velocity algorithm for use in the present invention.

The present invention thereby contemplates the use of a correction factor 74 to improve the effective baseline trailer brake controller output profile 60 at both low and high vehicle speeds 16. As the correction factor 74 is dependent on vehicle speed 16 input, the present invention contemplates an improvement in estimation of vehicle speed 16 through the use of vehicle dynamic status 80 (such as acceleration status) available from other vehicle systems (see FIG. 5). The present invention includes logic adapted to calculate the wheel speed 82 at a plurality of wheel locations 84. The wheel locations 84 are contemplated to encompass individual wheel locations such as Right Front 86, Left Front 88, Right Rear 90 and Left Rear 92. The wheel locations 84 are also intended to encompass readings such as the use of a differential speed sensor 94 which may be substituted for the rear wheel readings 90, 92. It is further contemplated that the wheel locations 84 may include trailer wheel locations 96 as opposed to the aforementioned towed vehicle locations. The present invention then determines if an acceleration event 98 is present. An acceleration event 98 is intended to encompass positive acceleration 100 (commonly just referred to as acceleration) in addition to negative acceleration 102 (commonly referred to as deceleration). The present invention uses the acceleration 98 to selectively choose one of the wheel speeds 82. The vehicle velocity 16 is then set based on the selectively chosen wheel speed 82.

It is contemplated that both the selective choosing of a wheel speed 82 in addition to the use in setting vehicle velocity 16 may be achieved in a variety of fashions. In one embodiment, when a positive acceleration 100 event is recognized, the wheel speeds are simultaneously compared. The slowest 104 of these wheel speeds 82 is then chosen and the vehicle velocity 16 is set as this slowest wheel speed 104. Similarly, during negative acceleration 102, the wheel speeds are compared and the fastest wheel speed 106 is selectively chosen and set as the vehicle velocity 16. Each of these chosen wheel speeds is then compared to physical limits of acceleration and if the change in this speed compared to the previously stored speed is outside of these limits, the newly stored speed is only advanced/decreased within the physical limit range.

Although a single wheel speed 104,106 may be utilized using this logic, it is contemplated that multiple wheel speeds 82 may be alternately utilized. In this embodiment vehicle acceleration 98 is utilized to selectively remove at least one of the wheel speeds 108. The logic is then adapted to calculate the vehicle velocity 16 and thereby the correction factor 74 based on the remaining wheel speeds 110. In one example, during deceleration 102, if a wheel speed indicates zero it is reasonable to assume that wheel is locked-up and therefore is removed from velocity calculations. In another example, during acceleration 100, an unreasonably high value indicates wheel slippage and therefore is removed. These two methodologies are not exclusive. During deceleration 102, if the fastest wheel speed 106 is selectively chosen, any wheel speeds 82 inconsistent with the fastest wheel speed 106 can be removed from the velocity calculation. The remaining velocities may be averaged or used in other algorithms to calculate a vehicle velocity 16. Similarly during acceleration 100, the slowest wheel speed 104 may be selected and any inconsistent values removed.

The present invention contemplates that the logic adapted to translate individual wheel speed 82 into vehicle velocity 16 may be accomplished directly within the trailer brake controller 10 by way of measuring wheel speed 82 using a plurality of wheel speed sensors 112, each of which located at one of the vehicle wheel locations 84. The individual wheel speeds 82 may be communicated to the trailer brake controller 10 wherein the selective choosing or selective removing may be accomplished. In an alternate embodiment, however, it is contemplated that the vehicle velocity 16 maybe calculated using the aforementioned methodologies using logic within the anti-lock braking system 23. In such an embodiment, it is contemplated that an output portal 114 be integrated into the anti-lock braking system 23 such that the trailer brake controller 10 may be placed in communication therewith during assembly through the use of a communication cable or similar data link. In this way, the anti-lock braking system 23 is adapted to port information to a host of vehicle systems.

While particular embodiments of the invention have been shown and described, numerous variations and alternative embodiments will occur to those skilled in the art. Accordingly, it is intended that the invention be limited only in terms of the appended claims.

What is claimed is:

1. A method of controlling a trailer brake system using a trailer brake controller positioned within a passenger vehicle comprising:
    receiving intended braking inputs and a vehicle speed;
    accessing a predetermined torque vs. speed vs. voltage data chart for the trailer brake system;
    estimating an effective brake torque loss from the torque vs. speed vs. voltage data chart based on the intended braking inputs and the vehicle speed;
    determining a correction factor to compensate for the estimated effective brake torque loss, the correction factor is determined from the predetermined torque vs. speed vs. voltage data chart;
    applying the correction factor to generate a corrected trailer brake controller output signal that compensates for lost torque, 2. The method as claimed in claim 1, wherein the step of determining the correction factor from the data chart further comprises the step of applying multivariate regression analysis for the intended braking inputs and the vehicle speed.

3. The method as claimed in claim 1, wherein the step of applying the correction factor to generate the trailer brake controller output signal further comprises applying the correction factor within a range of supply voltages to reduce brake torque as vehicle speed increases.

4. The method as claimed in claim 1, wherein the step of applying the correction factor to generate the trailer brake controller output signal further comprises applying the correction factor within a range of available supply voltages to gradually increase trailer brake torque as vehicle speed increases.

5. The method as claimed in claim 1, wherein the step of applying the correction factor to generate the trailer brake controller output signal further comprises applying the correction factor within a range of available supply voltages to maintain a constant brake torque.

6. The method as claimed in claim 1, wherein the step of receiving intended braking inputs and vehicle speed further comprises receiving intended braking inputs and vehicle speed from an anti-lock braking system.

7. The method as claimed in claim 6 wherein the step of receiving vehicle speed from an anti-lock braking system further comprises the steps of:
    measuring wheel speed at each of a plurality of vehicle wheels;
    determining if a deceleration event is present; and
    setting the vehicle velocity to a measured wheel speed that is a greatest of the measured wheel speeds when a deceleration event is present.

8. The method as claimed in claim 6 wherein the step of receiving vehicle speed from an anti-lock braking system further comprises the steps of:
    measuring wheel speed at each of a plurality of vehicle wheels;
    determining if an acceleration event is present; and
    setting the vehicle velocity to a measured wheel speed that is the smallest of the measured wheel speeds when an acceleration event is present.

9. The method as claimed in claim 1, wherein the step of receiving intended braking inputs and vehicle speed further comprises receiving intended braking, inputs and vehicle speed from an electronic stability control system.

10. The method as claimed in claim 9 wherein the step of receiving vehicle speed from the electronic stability control system further comprises the steps of:
    measuring wheel speed at each of a plurality of vehicle wheels;
    determining if a deceleration event is present; and
    setting the vehicle velocity to a measured wheel speed that is a greatest of the measured wheel speeds when a deceleration event is present.

11. The method as claimed in claim 9 wherein the step of receiving vehicle speed from the electronic stability control system further comprises the steps of:
    measuring wheel speed at each of a plurality of vehicle wheels;
    determining if an acceleration event is present; and
    setting the vehicle velocity to a measured wheel speed that is a smallest of the measured wheel speeds when an acceleration event is present.

12. A trailer brake controller for use in a passenger vehicle towing a trailer, the trailer brake controller comprising:
    a controller including logic adapted to receive intended braking inputs and vehicle speed from one of an anti-lock braking system or an electronic stability control system;
    the controller including logic adapted to access a predetermined trailer brake controller output profile and scale the predetermined trailer brake controller output profile in response to an adjustable gain setting set by an operator;
    the controller including logic adapted to access a plurality of stored baseline trailer brake controller output profiles;

the controller including logic adapted to select one of the plurality of stored baseline trailer brake controller output profiles dependent upon the intended brake inputs and the vehicle speed to set a correction factor; and the controller including logic adapted to adjust a trailer brake control output signal using the correction factor.

13. The trailer brake controller as claimed in claim 12 further comprising logic adapted to set the correction factor to increase brake torque for increased vehicle speeds.

14. The trailer brake controller as claimed in claim 12 further comprising logic adapted to set the correction factor to decrease brake torque for decreased vehicle speeds.

15. The trailer brake controller as claimed in claim 12 further comprising logic adapted to set the correction factor to maintain a constant: brake torque at increased vehicle speeds.

16. The trailer brake controller as claimed in claim 12 wherein the controller further comprises logic adapted to:
   receive a measured wheel speed for each of a plurality of vehicle wheels;
   determine the presence of a deceleration event; and
   set the vehicle speed to a greatest of the measured wheel speeds when the deceleration event is present.

17. The trailer brake controller as claimed in claim 12 wherein the controller further comprises logic adapted to:
   receive a measured wheel speed for each of a plurality of vehicle wheels,
   determine the presence of an acceleration event;
   set the vehicle speed to a smallest of the measured wheel speeds when the acceleration. event is present.

\* \* \* \* \*